(12) United States Patent
Zacharia et al.

(10) Patent No.: US 10,639,621 B2
(45) Date of Patent: May 5, 2020

(54) NANOPOROUS CERIUM OXIDE WITH INTERCONNECTED PORES FOR CATALYSIS AND A COST-EFFECTIVE METHOD OF PREPARING THEREOF

(71) Applicant: QATAR UNIVERSITY, Doha (QA)

(72) Inventors: Renju Zacharia, Doha (QA); Mohammed J Al-Marri, Doha (QA)

(73) Assignee: QATAR UNIVERSITY, Doha (QA)

( * ) Notice: Subject to any disclaimer, the term of this patent is extended or adjusted under 35 U.S.C. 154(b) by 85 days.

(21) Appl. No.: 15/912,171

(22) Filed: Mar. 5, 2018

(65) Prior Publication Data

US 2019/0270082 A1    Sep. 5, 2019

(51) Int. Cl.
| | | |
|---|---|---|
| *B01J 23/10* | (2006.01) | |
| *B01J 35/10* | (2006.01) | |
| *B01J 37/03* | (2006.01) | |
| *B01D 53/94* | (2006.01) | |

(52) U.S. Cl.
CPC ........ *B01J 35/1066* (2013.01); *B01D 53/945* (2013.01); *B01J 23/10* (2013.01); *B01J 37/031* (2013.01); *C01P 2006/14* (2013.01)

(58) Field of Classification Search
CPC ....... B01J 23/10; B01J 35/1066; B01J 37/031
See application file for complete search history.

(56) References Cited

U.S. PATENT DOCUMENTS

| | | |
|---|---|---|
| 4,316,822 A | 2/1982 | Fujitani et al. |
| 4,714,694 A | 12/1987 | Wan et al. |
| 5,491,120 A | 2/1996 | Voss et al. |
| 5,994,260 A | 11/1999 | Bonneau et al. |
| 7,056,856 B2 | 6/2006 | Summers et al. |
| 8,333,945 B2 | 12/2012 | McLaughlin et al. |
| 8,741,821 B2 | 6/2014 | Jao et al. |
| 9,993,803 B2 * | 6/2018 | Difrancesco .......... B01F 3/0807 |
| 10,160,658 B2 * | 12/2018 | Ohtake .................... B01J 20/06 |
| 2005/0031517 A1 | 2/2005 | Chan |
| 2013/0230444 A1 * | 9/2013 | Reed ..................... B01F 3/0807 |
| | | 423/263 |
| 2017/0057893 A1 * | 3/2017 | Cesana ................ B01J 35/1014 |
| 2017/0152421 A1 * | 6/2017 | Ohtake ................ C09K 3/1454 |

(Continued)

FOREIGN PATENT DOCUMENTS

| | | |
|---|---|---|
| CN | 1368529 A | 9/2002 |
| CN | 102020306 A | 4/2011 |
| CN | 103818943 A | 5/2014 |

(Continued)

OTHER PUBLICATIONS

International Search Report and Written Opinion dated Jul. 3, 2019 for Application No. PCT/IB2019/051737, 12 pages.

(Continued)

*Primary Examiner* — Cam N. Nguyen
(74) *Attorney, Agent, or Firm* — Squire Patton Boggs (US) LLP

(57) ABSTRACT

Provided herein are a method of making a nanoporous cerium oxide material which can be used for heterogeneous catalysis. The method may include mixing a cerium nitrate solution and an amine solution to form a mixture and stirring the mixture thus forming a nanoporous cerium oxide precipitate. Further, the molar ratio of cerium nitrate and the amine ranges from 2:1 to 5:1.

20 Claims, 3 Drawing Sheets

(56) References Cited

U.S. PATENT DOCUMENTS

2019/0202710 A1* 7/2019 Ohtake .................. B01J 23/10
2019/0330073 A1* 10/2019 Ohtake ............. B01D 53/9422

FOREIGN PATENT DOCUMENTS

| CN | 104448786 A | 3/2015 |
| CN | 105585043 A | 5/2016 |
| JP | 2009/190938 A | 8/2009 |
| KR | 10-2008-0054580 A | 6/2008 |

OTHER PUBLICATIONS

Benmouhoub, et al: "Synthesis and characterization of Cerium oxide (CeO2) nanoparticles", Materials Science Forum, Jan. 6, 2009, vol. 609, pp. 189-194.
Zagaynov, et al: "Formation of mesoporous nanocrystalline ceria from cerium nitrate, acetate or acetylacetonate", Applied Nanoscience, Mar. 2014, vol. 4, No. 3, entire document.

* cited by examiner

NANOPOROUS CERIUM OXIDE WITH INTERCONNECTED PORES FOR CATALYSIS AND A COST-EFFECTIVE METHOD OF PREPARING THEREOF

FIELD OF INVENTION

The present invention disclosed herein relates to a porous cerium oxide material for catalytic treatment of automobile exhaust and for templated growth of nanowires, and to a cost-effective single-step precipitation process for the production of thereof. The present invention specifically relates to producing porous cerium oxide having plurality of pores arranged along parallel lines, consisting of pores throughout an entire monolith, which are on the external and internal surfaces of the grain, and are interconnected through narrow constrictions.

DESCRIPTION OF RELATED ART

Cerium oxide is one of the most important catalyst stabilizing materials used in the treatment of automobile post-combustion emissions. For example, U.S. Pat. No. 7,056,856, herein incorporated by reference, discloses the use of cerium oxide for stabilizing tin oxide based catalytic materials employing precious metals at exhaust temperatures of internal combustion engines. U.S. Pat. No. 4,316,822, herein incorporated by reference, discloses a mixed catalyst comprising cerium oxide, zirconium oxide, platinum and palladium supported on a porous ceramic carrier for efficiently and effectively reducing nitrogen oxides, carbon monoxide and hydrocarbons from automobile exhaust gases. The aforementioned active catalytic material containing cerium oxide, zirconium oxide, platinum and palladium is impermeable, and it is support on a porous body which is realized by impregnating the porous body with the raw materials forming the catalytic material followed by drying and calcination. The use of bulk non-porous cerium oxide stabilized on alumina as catalyst is available in prior art. For example, U.S. Pat. Nos. 4,714,694 A and 5,491,120 A, herein incorporated by reference, discloses cerium oxide alone or in combination with second bulk oxide as oxidation catalyst, cited herein for reference.

Unlike bulk non-porous cerium oxide, porous cerium oxide having large surface area and good pore density and distribution and specific pore dimensions is beneficial for efficient catalysis. U.S. Pat. No. 5,994,260, herein incorporated by reference, discloses the preparation of a porous cerium oxide with uniform lamellar structure and its uses in catalysis. The aforementioned porous cerium oxide having Braunauer-Emmett-Teller specific surface area of 250 $m^2/g$ is prepared by heat treatment of cerium carbonate octahydrate in an atmosphere controlled to be an air/steam or oxygen/steam mixture containing 40% of steam volume fraction, preferably in a fluidized bed reactor in the temperature range between 130° C. and 150° C. Furthermore, the precursor cerium carbonate octahydrate is prepared by reacting the cerium nitrate with ammonium carbonate and then carefully drying the cerium carbonate having the higher degree of hydration, for example 15 to 22 $H_2O$, as disclosed in the aforementioned prior art. The heat treatment atmosphere for the preparation of porous cerium oxide is maintained to keep the precursor cerium carbonate in octahydrate form. The prior art, in addition, discloses that the residence times for the gas-solid reaction are calculated.

The present invention disclosed herein provides nanoporous cerium oxide with simplified and efficient production process and reduced energy and overall costs.

Preparation of porous cerium oxide catalysts by heat treatment as disclosed in prior arts requires precursor cerium carbonate octahydrate. The preparation of cerium carbonate octahydrate precursor is a multi-step process which involves reacting the commonly available cerium nitrate with ammonium carbonate to produce cerium carbonate with higher water of crystallization as the intermediate. The cerium carbonate intermediate with higher water of crystallization is further dried carefully to generate the cerium carbonate octahydrate. Furthermore, during the heat treatment of cerium carbonate octahydrate to produce the porous cerium oxide, the precursor material should be maintained in the octahydrate form. In the present invention disclosed herein, cerium nitrate is used in a single-step process to produce porous cerium oxide without the precursor cerium nitrate salt being converted to any intermediate forms. This results in simplification of processes and reduction of the process costs.

Preparation of porous cerium oxide by the heat treatment as disclosed in prior arts involves heating cerium carbonate octahydrate in an atmosphere containing air/steam or oxygen/steam mixture containing at least 40% steam. In the present invention disclosed herein, the porous cerium nitrate is reacted in ambient air. This reduces the process costs.

The heat treatment of cerium carbonate octahydrate in the presence of air/steam or oxygen/steam process is a gas-solid reaction which is more effective when a fluidized bed reactor is used. Fluidized bed reactors require continuous pumping of the gas-phase at specified velocity to suspend the solid-phase to effect the reaction. This adds to the energy cost of the process. Furthermore, particle filters are required to hinder the solid-phase from leaving the fluidized bed reactor. In the present invention disclosed herein, the reaction is effected in a liquid phase. Therefore, more effective and simpler stirred tank reactor can be used. This increases the reaction efficiency and the lifetime of the reactor, and reduces the energy cost.

The thermal treatment of cerium carbonate octahydrate as disclosed in the prior art is effective in the temperature range of 130° C. to 150° C. In the present invention disclosed herein, the liquid-phase reaction is effective in the temperature range of 40° C. to 70° C., which is 2 to 3 times lower than the reaction based on the prior art. This leads to cost savings.

SUMMARY

In one aspect of the present invention disclosed herein, provided is a method of making nanoporous cerium oxide, comprising mixing a cerium nitrate solution and an amine solution to form a mixture and stirring the mixture thereby forming a nanoporuous cerium oxide precipitate; wherein the molar ratio of cerium nitrate and the amine ranges from 2:1 to 5:1. In some embodiments, the method further comprises dissolving cerium nitrate or hydrate thereof in a mixture of alcohol and deionized water of a ratio of about 1:1 by weight or by volume to obtain the cerium nitrate solution. In some embodiments, the method further comprises dissolving an amine in an alcohol to obtain the amine solution. In some embodiment, the method further comprises washing the precipitate with a mixture of alcohol and water to remove residual amine; drying the precipitate; and calcining the precipitate.

In one aspect of the present invention disclosed herein, provided is nanoporous cerium oxide produced by the method disclosed herein.

The nanoporous cerium oxide of the present invention has a plurality of pores in the diameter range of about 100 to about 400 nm and evenly or substantially evenly spaced at a distance of about 500 nm to about 1000 nm; the pores are present on the internal and external surfaces of cerium oxide grain, and the internal and external pores are interconnected; the pores on the external surface of the nanoporous cerium oxide are uniform diameter and are present along evenly or substantially evenly spaced parallel line; and the pores are present on the entire external surface of the nanoporous cerium oxide grain.

DETAILED DESCRIPTION

Figure 1:
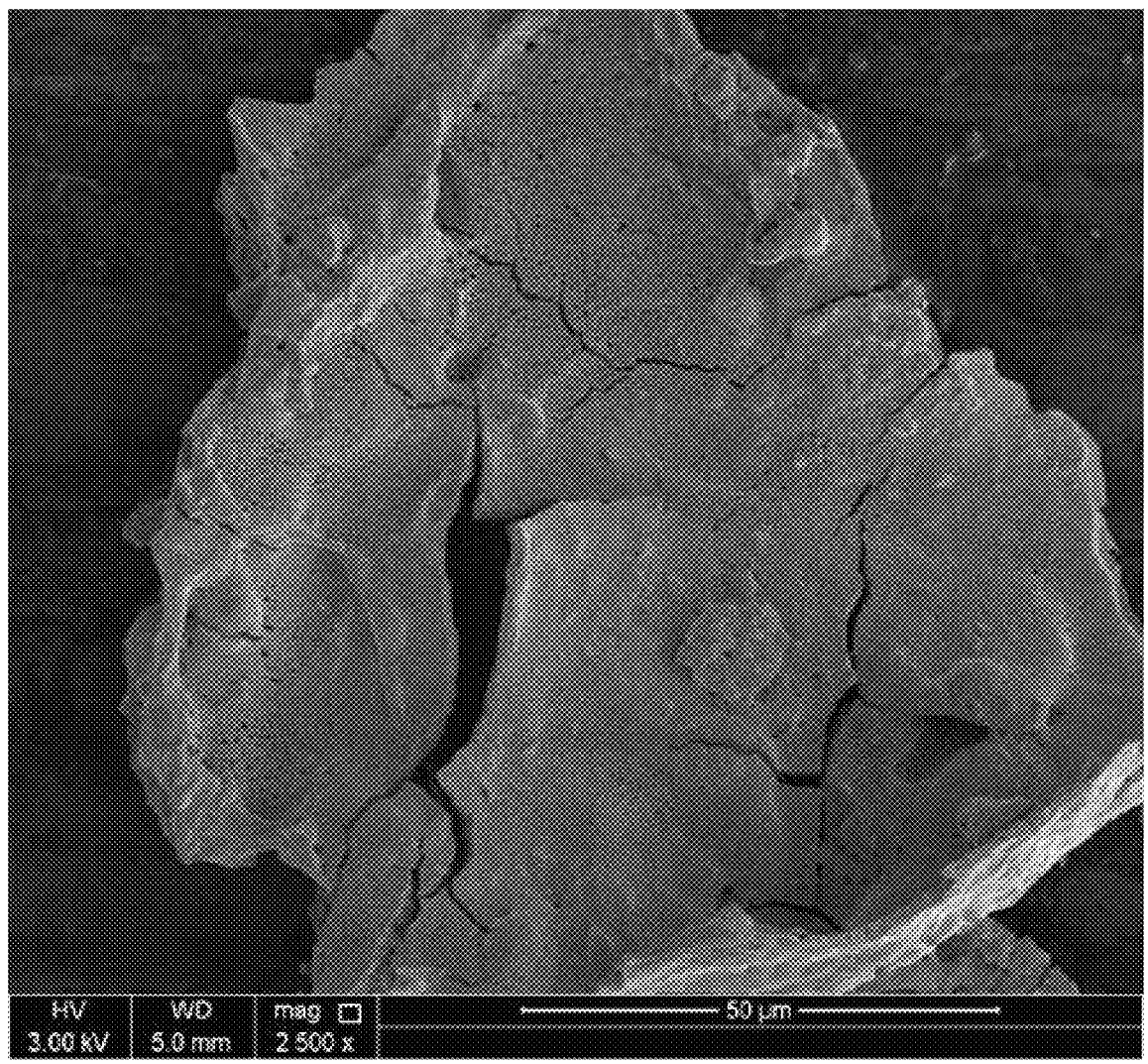
FIG. 1 shows a magnified image of a whole grain of cerium oxide showing the presence of pores in the entire grain.

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, "near," "about," "approximately," "substantially," "essentially," and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by up to ±10%, unless expressly stated otherwise.

In one aspect of the present invention disclosed herein, provided is a method of making nanoporous cerium oxide, comprising mixing a cerium nitrate solution and an amine solution to form a mixture and stirring the mixture thereby forming a nanoporuous cerium oxide precipitate;

wherein the molar ratio of cerium nitrate and the amine ranges from 2:1 to 5:1.

In some embodiments, the method further comprises dissolving cerium nitrate or hydrate thereof in a mixture of 1:1 alcohol and deionized water to obtain the cerium nitrate solution. In some embodiments, the alcohol is selected from the group consisting of isopropyl alcohol and ethyl alcohol. In some embodiments, the alcohol is isopropyl alcohol. In some embodiments, the alcohol is ethyl alcohol.

In some embodiments, the method further comprises dissolving an amine in an alcohol to obtain the amine solution. In some embodiments, the alcohol is selected from the group consisting of isopropyl alcohol and ethyl alcohol. In some embodiments, the alcohol is isopropyl alcohol. In some embodiments, the alcohol is ethyl alcohol.

In some embodiments, the method further comprises washing the precipitate with a mixture of alcohol and water to remove residual amine; drying the precipitate; and calcining the dried precipitate.

In some embodiments, the alcohol is selected from the group consisting of isopropyl alcohol and ethyl alcohol. In some embodiments, the alcohol is isopropyl alcohol. In some embodiments, the alcohol is ethyl alcohol.

In some embodiments, cerium nitrate hexahydrate is used.

In some embodiments, the amine is selected from the group consisting of cyclohexalamine and polyethyleneimine. In some embodiments, the amine is cyclohexalamine. In some embodiments, the amine is polyethyleneimine.

In some embodiments, the mixture of cerium nitrate solution and an amine solution is stirring at a temperature ranging from about 40° C. to about 70° C. In some embodiments, the mixture is stirred for about 4 hours to about 96 hours.

In some embodiments, the cerium oxide precipitate is dried at about 60° C. under vacuum for about 24 hours.

In some embodiments, the dried cerium oxide precipitate is calcined at a temperature ranging from about 500° C. to about 600° C.

In some embodiments, the concentration of the amine in the amine solution is ranging from about 5% to about 20% by weight or by volume. In some embodiments, the concentration of the amine in the amine solution is about 10% by weight or by volume.

In some embodiments, the ratio of cerium nitrate and amine and the reaction temperature are adjusted so that the pore sizes of the nanoporous cerium oxide is within the range of about 100 nm to about 400 nm and the pores are spaced evenly or substantially evenly at a distance of about 500 nm to about 1000 nm.

In one aspect of the present invention disclosed herein, provided is nanoporous cerium oxide produced by the method disclosed herein.

In one aspect of the present invention disclosed herein, provided is nanoporous cerium oxide having the following characteristics:

the nanoporous cerium oxide has a plurality of pores in the diameter range of about 100 to about 400 nm and evenly or substantially evenly spaced at a distance of about 500 nm to about 1000 nm, the pores are present on the internal and external surfaces of cerium oxide grain and the internal and external pores are interconnected, the pores on the external surface of the nanoporous cerium oxide are uniform diameter and are present along evenly or substantially evenly spaced parallel line; and the pores are present on the entire external surface of the nanoporous cerium oxide grain.

The present invention disclosed herein relates to producing porous cerium oxide catalyst having plurality of pores arranged along parallel lines, consisting of interconnecting pores on the external and internal surfaces. Specifically this invention relates to the production of porous cerium oxide having plurality of pores in the diameter range of about 100 nm to about 400 nm arranged along parallel lines via a cost-effective single-step precipitation process.

The present invention disclosed herein provides a cerium oxide material for heterogeneous catalysis having uniform pores in the diameter range of about 100 nm to about 400 nm throughout the internal and external surfaces of the grain. Plurality of pores are arranged roughly along parallel lines, present on the internal and external surfaces of the grain, and interconnected through narrow constrictions. The method of preparing aforesaid oxide comprises of a cost-effective single step precipitation reaction between a cerium compound and amines. The porous oxide disclosed here is useful for applications including heterogeneous catalysis for emission control, desalination, ultrafiltration, hyperfiltration, and templated growth of nanowires and device containing thereof.

The present invention disclosed herein provide a novel cerium oxide catalyst containing pores throughout the grain and arranged in evenly or substantially evenly spaced parallel lines. The catalyst has pores on the internal and external surfaces and the pores are interconnected through narrow constrictions. The pore size can be controlled by a simple process of adjusting the ratio of precursor cerium salt and amine, and the reaction temperature. The cerium oxide catalyst that is produced through a novel cost-effective single-step precipitation process.

The present invention disclosed herein has several main features. One feature of the present invention is that a single step liquid-phase reaction is used herein for producing nanoporous cerium oxide.

Another feature is that by adjusting the ratio of cerium salt and amine, and the reaction temperature, the pore sizes can be controlled in the range of about 100 nm to about 400 nm and are spaced evenly at a distance of about 500 nm to about 1000 nm.

Another feature of the present invention is that it requires only commonly available cerium salt and uses low-cost solvents in a conventional stirred reactor.

An advantage of the present invention is that no need of steam or its mixture is necessary to produce the porous cerium oxide.

Another feature of the present invention is that the pores are created in the internal and external surfaces of cerium oxide grain and the internal and external pores are interconnected through constrictions.

Another feature of the present invention is that the pores on the external surface are uniform diameter and are present along roughly evenly spaced parallel lines.

Another feature of the invention is that pores are present on the entire external surface of the grain.

The present invention has utility in production of nanoporous cerium oxide catalyst cost effectively. The present invention relates to the production of nanoporous cerium oxide catalyst using cost effective precipitation route. Nonporous cerium oxide effected on porous body has been used as catalyst for reducing the post-combustion emissions from internal combustion engines. Porous cerium oxide disclosed in the present invention has high density of uniform pores, which is useful in a range of applications including emission control, heterogeneous catalysis, templated growth of nanowires, desalination, and filtration.

Emissions from internal combustion engines of automobiles contain environmentally noxious gases including carbon monoxide, nitrogen oxides and hydrocarbons. Bulk cerium oxide alone or used with other metal oxides is an important catalyst for treating exhaust emissions globally. Nanoporous cerium oxides having good density of uniform pores increases the efficiency of the catalytic conversion of carbon monoxide, nitrogen oxides and hydrocarbons. A cost-effective preparation method disclosed in this invention would be very important for OEMs developing automobiles exhaust system for the bulk production of highly efficient exhaust catalysts.

Examples and Experiments

The nanoporous cerium oxide of the present invention was produced by a single-step precipitation method. In typical preparation procedure, cerium nitrate is dissolved in 1:1 alcohol-deionized water under continuous magnetic stirring. In another vessel, a solution of an amine is prepared in alcohol. The amine and cerium nitrate solutions are mixed and heated on a hot plate. The precipitated nanoporous oxide is washed with alcohol-water mixture to remove the residual amines and calcined.

Example 1

1.86 ml of cyclohexylamine was mixed with 20 ml of isopropyl alcohol. In another vessel cerium nitrate hexahydrate was dissolved in 60 ml of solution containing 50:50 (by volume) deionized water and isopropyl alcohol (30 ml). The amount of cerium nitrate hexahydrate used was to maintain a molar ratio range of 2:1 to 5:1 with the cyclohexylamine. The cyclohexylamine solution was poured into the cerium nitrate solution and the solution was stirred for 4 hours to 96 hours on a hot plate at temperature range of 0° C.-70° C. Afterwards, the precipitate formed was washed with 100 mL of isopropyl alcohol-water mixture, filtered off, and dried in the oven at 60° C. under vacuum for 24 hours. The dried cerium oxide precipitate was calcined at 500° C.-600° C.

Example 2

In a variant of the process of Example 1, polyethyleneimine was used instead of cyclohexylamine to produce the nanoporous cerium oxide.

Figure 2:
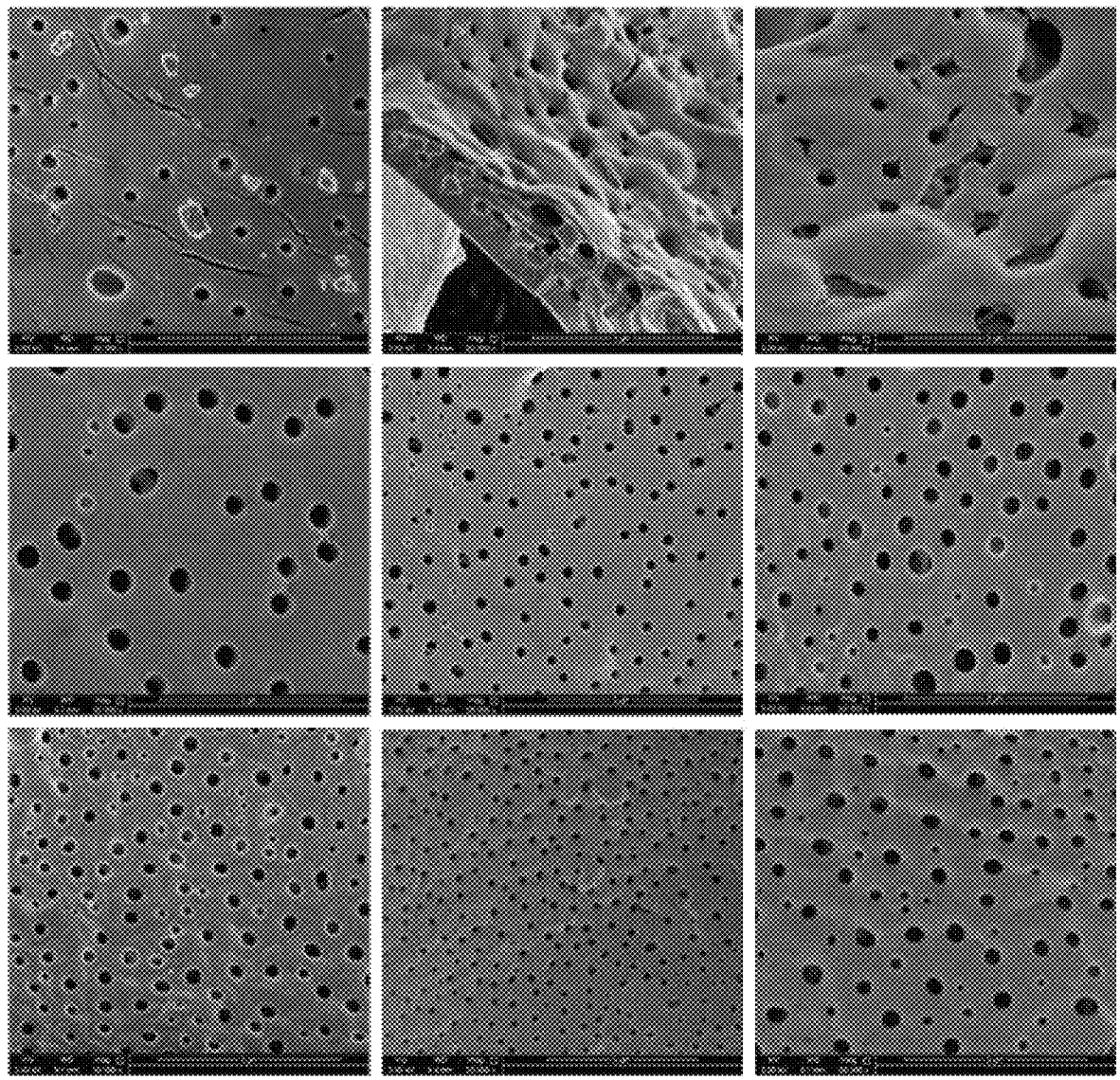
FIG. 2 shows magnified SEM images of cerium oxide showing pore distribution on the internal and external surfaces.
Figure 3:
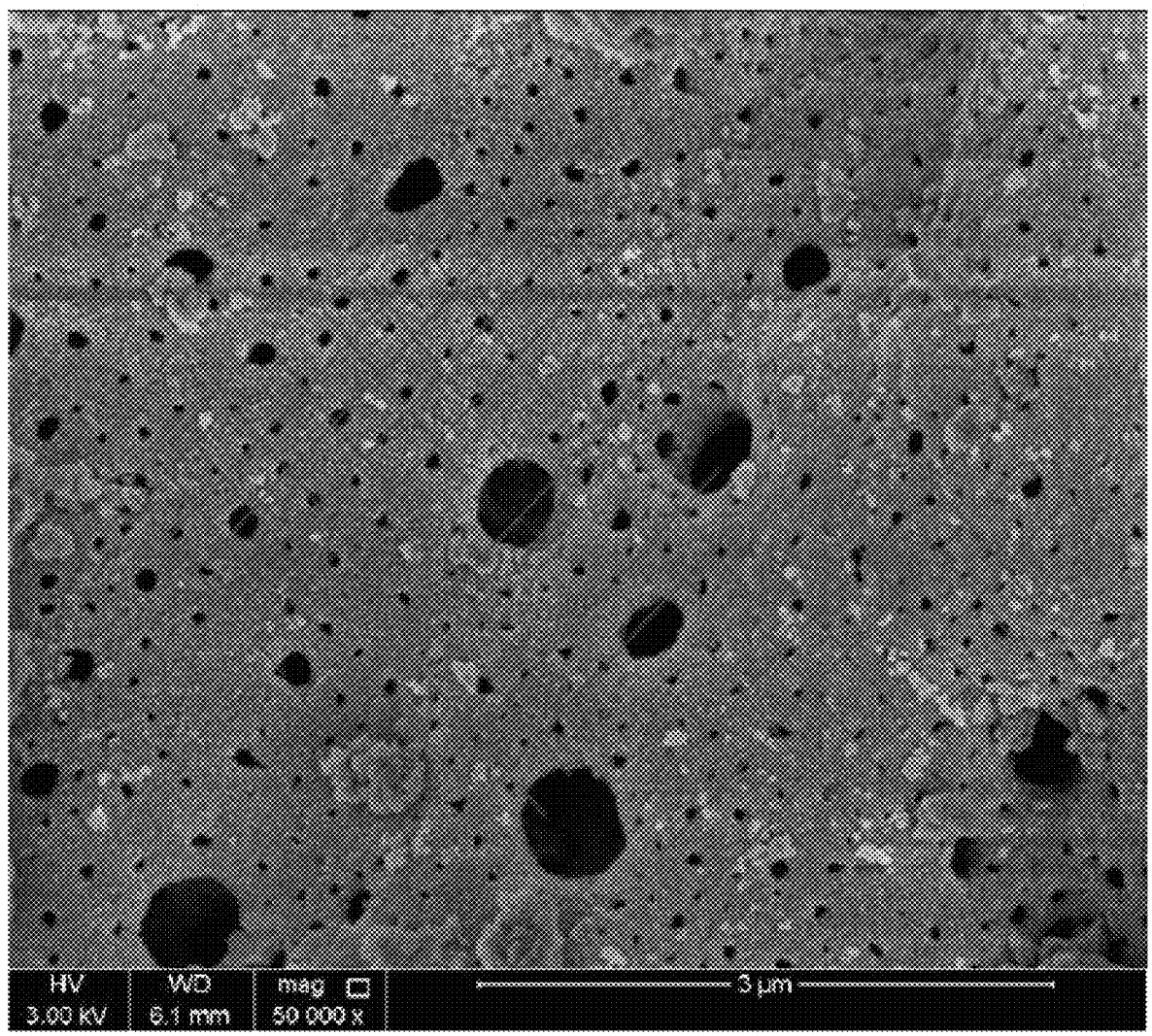
FIG. 3 shows magnified SEM image of porous cerium oxide showing the arrangement nanopores along parallel lines.

The SEM (scanning electron microscope) images of final product are shown in the FIGS. 1-3. FIG. 1 shows a magnified (×2500 times) image of a whole grain of cerium oxide showing the presence of pores in the entire grain. FIG. 2 shows magnified SEM images of cerium oxide showing pore distribution on the internal and external surfaces. FIG. 3 shows magnified (×50,000 times) SEM image of porous cerium oxide showing the arrangement nanopores along parallel lines.

Example 3

In another variant of the process of Example 1, ethyl alcohol was used instead of isopropyl alcohol.

Example 4

In another variant of the process of Example 1, the amount of cerium nitrate used is 1.16 g to 2.95 g.

What is claimed is:
1. A method of making nanoporous cerium oxide, comprising
   mixing a cerium nitrate solution and an amine solution to form a mixture and stirring the mixture thus forming a nanoporous cerium oxide precipitate;
   wherein the molar ratio of cerium nitrate and the amine ranges from 2:1 to 5:1.

2. The method of claim 1, further comprising
dissolving cerium nitrate or a hydrate thereof in a mixture of alcohol and deionized water of a ratio about 1:1 by weight or by volume to obtain the cerium nitrate solution.

3. The method of claim 2, wherein in the alcohol is selected from the group consisting of isopropyl alcohol and ethyl alcohol.

4. The method of claim 3, wherein the alcohol is isopropyl alcohol.

5. The method of claim 3, wherein the alcohol is ethyl alcohol.

6. The method of claim 1, further comprising
dissolving an amine in an alcohol to obtain the amine solution.

7. The method of claim 6, wherein in the alcohol is selected from the group consisting of isopropyl alcohol and ethyl alcohol.

8. The method of claim 1, further comprising
washing the precipitate with a mixture of alcohol and water to remove residual amine;
drying the precipitate; and
calcining the precipitate.

9. The method of claim 8, wherein in the alcohol is selected from the group consisting of isopropyl alcohol and ethyl alcohol.

10. The method of claim 8, wherein the precipitate is dried at about 60° C. under vacuum for about 24 hours.

11. The method of claim 8, wherein cerium oxide precipitate is calcined at a temperature ranging from about 500° C. to about 600° C.

12. The method of claim 1, wherein the hydrate of cerium nitrate is cerium nitrate hexahydrate.

13. The method of claim 1, wherein the amine is selected from the group consisting of cyclohexalamine and polyethyleneimine.

14. The method of claim 1, wherein the amine is cyclohexalamine.

15. The method of claim 1, wherein the amine is polyethyleneimine.

16. The method of claim 1, wherein the mixture is stirring at a temperature ranging from 40° C. to 70° C.

17. The method of claim 1, wherein the mixture is stirred for about 4 hours to about 96 hours.

18. The method of claim 1, wherein the concentration of the amine in the amine solution is ranging from about 5% to about 20% by weight or by volume.

19. The method of claim 1, wherein the concentration of the amine solution is about 10% by weight or by volume.

20. The method of claim 1, wherein the ratio of cerium nitrate and amine and the reaction temperature are adjusted so that the pore sizes of the nanoporous cerium oxide is within the range of about 100 nm to about 400 nm and the pores are spaced substantially evenly at a distance of about 500 nm to about 1000 nm.

* * * * *